United States Patent [19]

de Canecaude

[11] Patent Number: 4,697,656
[45] Date of Patent: Oct. 6, 1987

[54] DEVICE FOR WEIGHING INDIVIDUALS ON A TOILET SEAT

[76] Inventor: Emmanuel de Canecaude, 4 bis, rue Albert Joly, F-78000 Versailles, France

[21] Appl. No.: 810,384

[22] PCT Filed: Apr. 1, 1985

[86] PCT No.: PCT/FR85/00071
§ 371 Date: Apr. 9, 1986
§ 102(e) Date: Apr. 9, 1986

[87] PCT Pub. No.: WO85/04472
PCT Pub. Date: Oct. 10, 1985

[30] Foreign Application Priority Data
Apr. 2, 1984 [FR] France ............... 84 05171
Dec. 17, 1984 [FR] France ............... 84 19294

[51] Int. Cl.⁴ ............... G01G 19/52; G01G 5/04
[52] U.S. Cl. ............... 177/144; 177/209
[58] Field of Search ............... 177/144, 209, 262

[56] References Cited

U.S. PATENT DOCUMENTS 2,057,024 10/1936 Gunnison ............... 177/144
3,949,432 4/1976 Ginsburg .
4,056,156 11/1977 Dayton .
4,489,799 12/1984 Menon .

FOREIGN PATENT DOCUMENTS 356397 4/1980 Austria .
2219108 10/1973 Fed. Rep. of Germany ...... 177/144
2452348 5/1976 Fed. Rep. of Germany ...... 177/144

Primary Examiner—George H. Miller, Jr.
Attorney, Agent, or Firm—Browdy and Neimark

[57] ABSTRACT

The weighing device comprises at least a force sensor (1,2,3) integrated in a toilet seat (4) resting on the upper edge of the bowl (11); the sensor works with an electronic unit (6) comprising means for formatting the measurement signal that drives a means (8) for displaying the user's weight, said means (8) being placed on an extension (9) of seat (4); the hinge along the XX axis comprises an oblong hole to avoid affecting the measurement.

10 Claims, 9 Drawing Figures

DEVICE FOR WEIGHING INDIVIDUALS ON A TOILET SEAT

The invention relates to a device for weighing individuals on a toilet seat.

Bathroom scales have already been known for a long time. They are cumbersome, independent apparatuses, rarely used, whereas the weight of an individual is linked to his general state of health. To maintain this state of health, it is necessary regularly to monitor fluctuations in this weight.

The device according to the invention has as its object to show these possible fluctuations in weight without the particular obligation of monitoring, by placing the weighing device in a place where every individual in civilized countries goes, namely, the toilet seat.

According to a first embodiment of the device according to the invention, measurement of weight is performed by force sensors, or strain gages, working with an electronic computer defining the weight measured by said sensors and delivering a signal through an electronic formatting means to a digital display means, for example, a liquid crystal display or others. The display can be outside the seat. Any known measuring means can be used for furnishing the weight. According to a second embodiment of the device, weighing is performed by means of hydraulic sensors such as described in French patent No. 84 18 936. It comprises as least three points of resting on the toilet bowl made directly with hydraulic sensors molded in a single piece with the toilet seat; the hinge of the seat exhibits sufficient play so as not to disturb the measurement. Said sensors are each made up of a cylinder filled with hydraulic fluid transmitting pressure and closed fluid-tight by a flexible membrane resting on a shouldered piston resting on the bowl, guide and held by an extension of the sensor.

In a variant according to the invention the piston is replaced by a semirigid membrane fastened to the base of each of the sensors and having the function of putting the transmission fluid under direct static pressure as a function of the weight of the user, said pressure being displayed on a known type measuring means, for example, a needle pressure gage placed on an extension at the front of the seat.

The advantage of this invention are the following:
regular weight monitoring without having to think about it beforehand, by the simple fact of sitting down on the toilet seat according to the invention;
regular information on weight fluctuations makes it possible to monitor food intake more closely and consequently to contribute to maintaining a better state of health;
greater simplicity in embodiment;
great reliability, particularly with hydraulic sensors because of the absence of leaks and the very low production cost.

The invention is described in detail in the following description with reference to the accompanying drawings given by way of nonlimiting example and in which.

Figure 1:
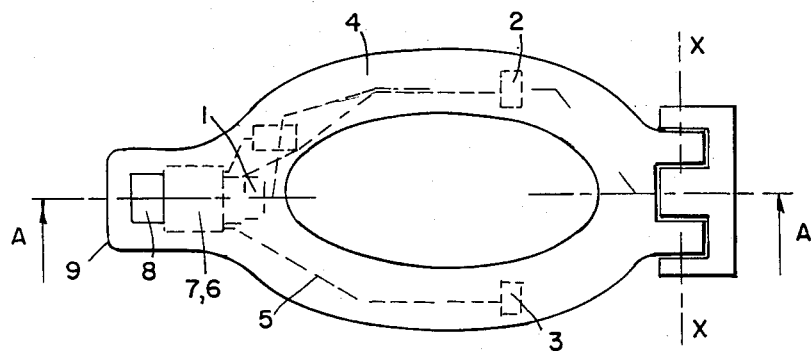
FIG. 1 shows, in top view, an embodiment of the weighing device according to the invention.
Figure 3:
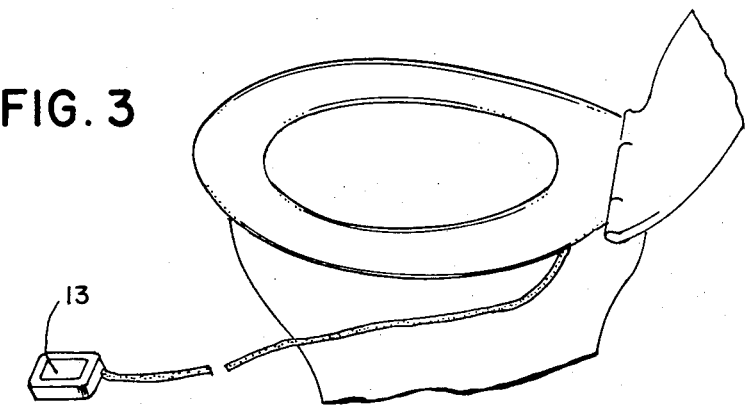
FIG. 3 shows, in perspective, an example of outside weight display.

As shown in FIG. 1, the device according to the invention comprises three force sensors 1, 2, 3 placed in a triangular resting on the upper edge of bowl 11. Said sensors are integrated in seat 4 and connected by electric conductors 5 to an electronic unit 6 fed by an electronic supply provided by a battery 7; said unit further comprises a means for formatting measurement signals delivered by the sensors transmitting the total weight to a digital display means 8 placed on an extension 9 of the front of seat 4. The measurement signal can be transmitted by wire to an outside display means 13 (FIG. 3) or else be sent without wire by a transmitter to a suitable electromagnetic receiver of known type. It is also possible to use a voice synthesis unit controlled by a switch.

Figure 2:
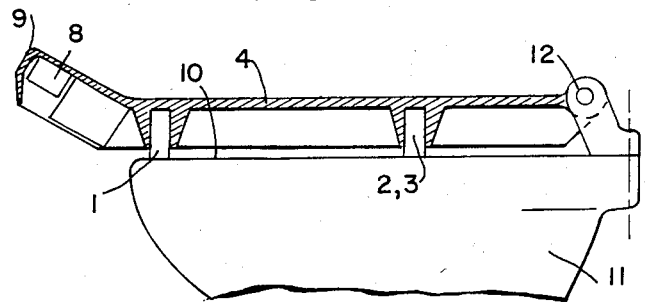
FIG. 2 shows, in section AA of FIG. 1, an example of the arrangement of the weight measuring means.

FIG. 2 shows the arrangement of measurement sensors 1, 2, 3 integrated in seat 4. Said sensors rest on upper edge 10 of bowl 11. Seat 4 is hinged at the back along axis XX, or in an oblong opening, or in a hole 12 exhibiting sufficient play so as not to introduce stray stressess during the measurement.

The weight information can be displayed constantly or only periodically to save the battery, or else by pressing on a button for turning on fleeting action.

It is also possible to use a printer to deliver a ticket bearing the date and weight to make comparisons over long periods. Said ticket can also be of toilet paper.

The weight information can also be provided by a mechanical display means of known type. To avoid bending of the seat which could be prejudicial to the measurement, it can be stiffened by using, for example, a metal grate stamped in the shape of a seat and overfilled with plastic of suitable mechanical rigidity. It is also possible to use to cover of the toilet seat to include a known type bathroom scale there.

Of course, for an individual to weigh he has to lift his feet slightly off the floor so that his total weight rests on the weighing seat.

Figure 4:
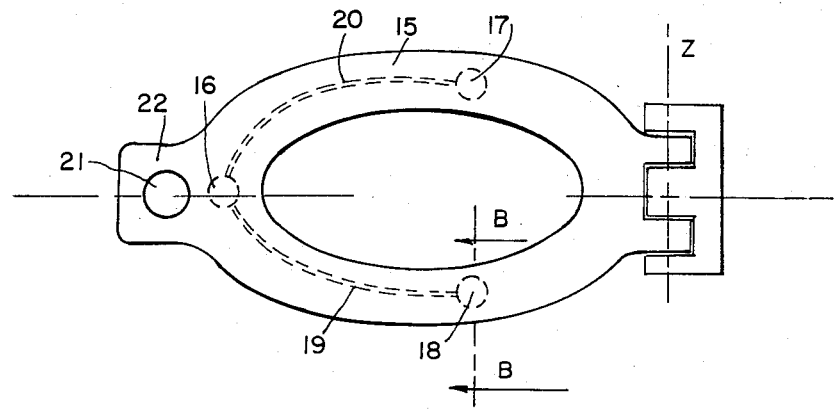
FIG. 4 show diagrammatically, in top view, the hydraulic weighing device adapted according to the invention.

As shown diagrammatically in top view in FIG. 4, the weighing seat according to the invention is fitted to making the weighing when an individual is sitting on it. It comprises a seat 15 hinged at the back along axis ZZ with sufficient play to avoid disturbing the measurement. Three sensors 16, 17, 18 are placed in a triangle to balance the load, since sensors are then put in series by hydraulic pipes 19, 20, the unit forming a hydraulic circuit under balanced pressure. The weight measurement is made with a needle pressure gage 21 connected on the circuit and placed, for example, at the front of the seat on an extension 22 to show it to the used, or else by a force sensor.

Figure 5:
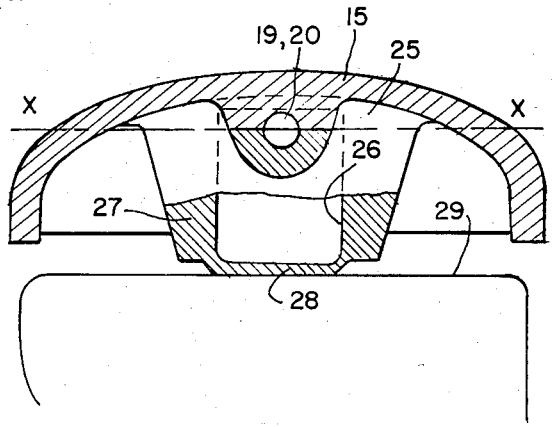
FIG. 5 shows, in section along BB of FIG. 4, the integration of a hydraulic sensor on a toilet seat.

FIG. 5 shows, in section along BB of FIG. 4, an example of integration of a hydraulic measurement sensor in the seat and in which a bore 26 extends in a second boss 27 attached by gluing along a plane XX, said extension ending at its base in a semirigid membrane 28 molded with boss 27, making it possible to pressurized under load the transmission liquid filling said sensor resting on bowl 29. A pipe for applying under balanced pressure 19, 20 comes out of bore 26, said pipe being partially molded along plane XX with bosses 27, the unit being attached by gluing on the other part which is incorporated in the seat.

Figure 6:
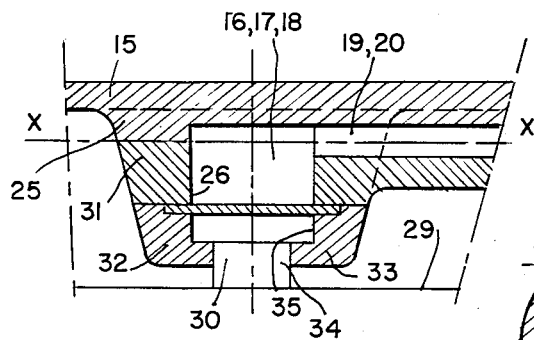
FIG. 6 shows a variant of the hydraulic sensor also integrated in the seat by molding.
Figure 7:
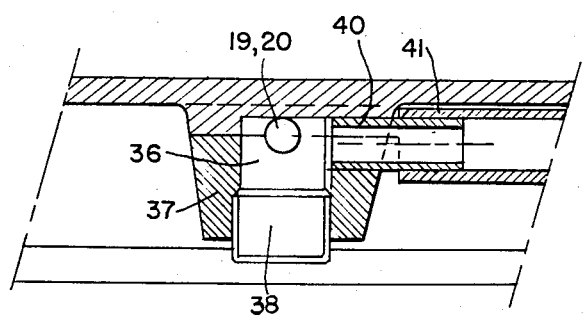
FIG. 7 shows, in section, the orifices for filling the transmission fluid and zero adjustment.

To improved weighing precision, semirigid membrane 28 (of FIG. 5) is replaced by a flexible membrane 30 made solid by gluing to an intermediate boss 31 replacing boss 27, in a corresponding annular slot of a boss 32 ending in a shoulder 33 receiving shouldered piston 34 placed between membrane 30 and shoulder 33 of extension 32, guided in bores 26 and 35, the base of said piston resting on edge 29 of the bowl. Before putting them into operation, sensors 16, 17, 18 and pipes 19, 20 are filled by an orifice 36 made in a boss 37 (FIG. 7) into which one of pipes 19, 20 comes out. This orifice is closed fluid-tight by a screw 38 until the shoulder of pistons 34 rests on the corresponding shoulder of bosses 32 (FIG. 6). There is shown on boss 37 a fitting 40 on which is mounted a pipe 41 connected to pressure gage 21 (FIG. 4).

Of course, it is possible to use any known measuring means, piezoelectric, strain gage etc. . . . and of weight display able continuously to reflect the user's weight.

Figure 8:
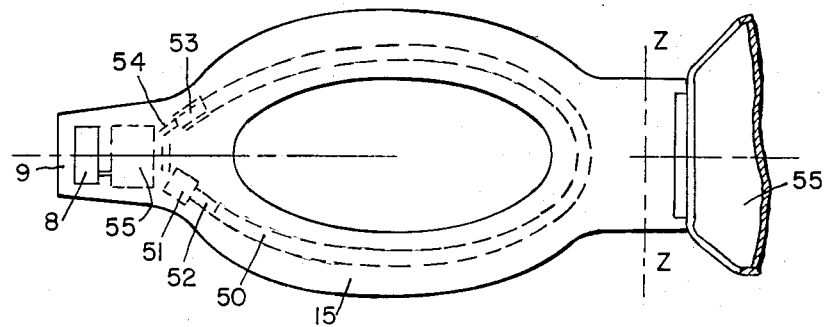
FIG. 8 and 9 show a simplified variant of FIG. 4.
Figure 9:
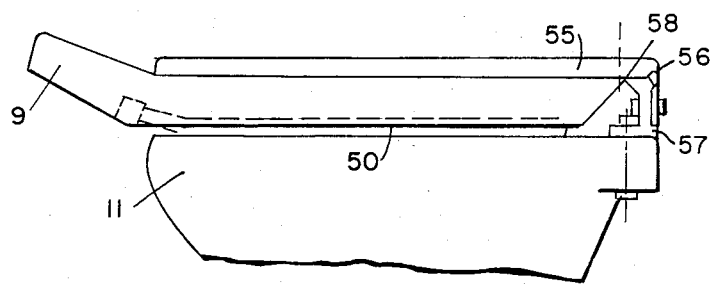

Such a weight measuring means is particularly useful for handicapped persons who have difficulty in standing on a traditional bathroom scale without a cane. FIG. 8 and 9 show a simplified variant of a weighing means associating a hydraulic pipe 50, as a sensor of weight in the form of a pressure measured at one end of said pipe, for example, by a strain gage placed in a unit 51 comprising a fitting 52 on which pipe 50 is mounted, the gage being protected from the pressure transmission liquid by a separation membrane, the other end of said pipe receiving a fitting 53 in which is screwed a zero adjustment screw allowing filling of the transmission liquid. Said pipe 50, which can be a simple plastic pipe, is made solid with the seat; it can, for example, be glued into a molded groove. A great part of its length rests on top of the bowl.

The force sensor (strain gage) works with an electronic unit 55 for formatting the measurement signal of the pressure of the transmission liquid to make it compatible with a weight display means 8 placed on the front of seat 9. It is also possible to use a compatible precision pressure gage, graduated in kilograms instead of the strain gage.

FIG. 9 shows the arrangement of pipe 50 resting on the top of bowl 11, the two free ends are raised toward the front to keep them from introducing a stray strain on the measurement. There is also shown, by way of example, a cover 55 comprising an elastic hinge 56 fastened to the back of hinge 57 to make it independent of the seat and avoid disturbing the measurement of the weight. In this example, the seat also comprises an elastic hinge 58 consisting of a bending line of very slight thickness not disturbing the measurement.

The weight measurement sensor of FIG. 1 consists of three active strain gage blades mounted in series in a Wheatstone bridge. The blades are mounted each oriented toward the epicenter of the seat and the sensitivity of each of them is adjusted by playing particularly on the flexibility of the resting point of its support to deliver an identical signal for the same weight. To avoid measurement distortions on the active blades, the part of their support resting on the bowl is of semirigid material.

I claim:

1. Device for weighing individuals on a toilet seat, comprising a seat (4) and a cover hinged on a support fastened to a bowl (11), means for measurement of the user's weight made solid with seat (4) made to rest on the upper edge of bowl (11), said measuring means work with a means (8) for displaying the user's weight, the hinge of the seat is provided with an oblong hole or with sufficient play to avoid disturbing the measurement, characterized in that means for measurement of the user's weight consist of three active strain gage blades mounted in series on a Wheatstone bridge together forming a sensor, said blades are oriented toward the epicenter of seat (4), and the part of the support of said blades in contact with the bowl is of semirigid material, and said sensor works with an electronic unit comprising means for formatting the measurement signal and for transmission to a digital weight display means (8, 13) placed on a front extension (9) of the seat, and the seat is overfilled on a rigid metallic structure, and hinge (56) of cover (55) is fastened on a support (57) outside of the seat.

2. Device as in claim 1, wherein the measurement signal coming from the electronic formatting unit is sent by an electromagnetic wave transmitter to an outside weight signal receiver.

3. Device as in claim 1, wherein the measurement signal coming from the electronic formatting unit drives an electronic voice synthesis unit for indicating the weight of the user under the action of a fleeting action control button.

4. Device as in claim 1, wherein the means for displaying the weight is a printer delivering a ticket bearing the results of the measurement and the corresponding date.

5. Device for weighing a user of a toilet, comprising
   a toilet seat (15) fastened by hinges to a bowl (11) and,
   means for measurement of the user's weight made integrally with said seat (4) and to rest on the upper edge of said bowl (11), including means (8) for displaying the user's weight,
   wherein each said hinge of the seat is provided with an oblong hole or with sufficient play to avoid disturbing the weight measurement, and
   said means for measurement of the user's weight includes at least one hydraulic sensor (16,17,18) fastened under said seat (15), and connected to a rigid pipe (19, 20) filled with a pressure transmission liquid, each said sensor (16,17,18) resting on the top edge (29) of the bowl (11) and measuring the pressure prevailing in the pressure transmission liquid therein, and means for displaying said pressure translated into the corresponding weight for display.

6. Device as in claim 5, wherein said hydraulic sensors (16,17,18), pipe (19,20) and means for filling them with said pressure transmission liquid and for zero adjustment (36,37,38) thereof are molded in a single piece with said seat (15).

7. Device as in claim 5, wherein said hydraulic sensors (16,17,18), pipe (19,20) and means for filling them with said pressure transmission liquid (36,37) are molded in at least two plastic parts, and said parts are then glued along a plane (XX) connecting lower parts of the pipe, sensors and their filling means with corresponding upper parts thereof molded in the body of the seat (15).

8. Device as in claim 5, comprising three of said sensors distributed under said seat (15) and connected by said pipe.

9. Device as in claim 5, wherein each said hydraulic sensor is isolated from said pressure transmission fluid by a respective membrane (30).

10. Device for weighing a user of a toilet, comprising a toilet seat (15) fastened by hinges to a bowl (11) and, means for measurement of the user's weight made integrally with said seat (4) and to rest on the upper edge of said bowl (11), including means (8) for displaying the user's weight, wherein each said hinge of the seat is provided with an oblong hole or with sufficient play to avoid disturbing the weight measurement, and said means for measurement of the user's weight including a flexible pipe (50) provided with the seat (15) to rest on the top of the bowl (11) over a large part of its length, a zero adjustment screw (54) placed in a first fitting (53) at one end of the flexible pipe (50), and a second fitting (52) of a unit (51) in which is placed said at least one sensor protected by a membrane, said second fitting being connected to the other end of said flexible pipe, and an electronic unit connected to said at least one sensor for converting the pressure of the pressure transmission liquid for digital display by said displaying means at the front of the seat.

* * * * *